US005142434A

United States Patent [19]

Boy et al.

[11] Patent Number: 5,142,434

[45] Date of Patent: Aug. 25, 1992

[54] OVERVOLTAGE ARRESTER WITH AIR GAP

[75] Inventors: Juergen Boy; Oskar Sippekamp, both of Berlin; Gerhard Schwenda, Grosshabersdorf, all of Fed. Rep. of Germany

[73] Assignee: Siemens Aktiengesellschaft, Munich, Fed. Rep. of Germany

[21] Appl. No.: 422,675

[22] Filed: Oct. 17, 1989

[30] Foreign Application Priority Data

Oct. 18, 1988 [DE] Fed. Rep. of Germany ....... 3835921

[51] Int. Cl.[5] ............ H02H 3/22

[52] U.S. Cl. ............ 361/120; 361/119; 361/117

[58] Field of Search ............ 361/111, 117, 119, 247, 361/124

[56] References Cited

U.S. PATENT DOCUMENTS

| | | | |
|---|---|---|---|
| 3,886,411 | 5/1975 | Klayum | 361/119 |
| 4,128,855 | 12/1978 | Gilberts | 361/119 |
| 4,320,435 | 3/1982 | Jones . | |
| 4,366,412 | 12/1982 | Lange et al. | 313/325 |
| 4,458,288 | 7/1984 | Chapman, Jr. et al. . | |
| 4,502,087 | 12/1985 | Huvet | 361/119 |
| 4,736,269 | 4/1988 | Amein et al. | 361/128 |

FOREIGN PATENT DOCUMENTS

| | | |
|---|---|---|
| 2740695 | 11/1978 | Fed. Rep. of Germany . |
| 2951467 | 6/1982 | Fed. Rep. of Germany . |
| 3118137 | 4/1986 | Fed. Rep. of Germany . |

*Primary Examiner*—Steven L. Stephan
*Assistant Examiner*—Ben Davidson

[57] ABSTRACT

For reducing the engineering cost of construction and manufacture for the air gap associated with the second electrode in an overvoltage arrester with air gap connected in parallel, the arrester (22) is enclosed by a cylindrical metal sleeve (28). One edge (19) of this metal sleeve contacts the first electrode (3) of the arrester, while the other edge (14) is laid over inwardly and grips the auxiliary electrode (27) placed on the second electrode (25) with interposition of an insulating disk (26). The outside diameter of this auxiliary electrode (27) is greater than the outside diameter of the second electrode (25). For the centering of the arrester (22) in the metal sleeve (28) the distance between the arrester and the metal sleeve is smaller, at least at three points over the circumference, than the required radial safety distance between the metal sleeve and the second electrode. This can be achieved, for example, by several punctiform depressions (30) of the metal sleeve arranged uniformly distributed over the circumference or also by an annular construction (29).

4 Claims, 2 Drawing Sheets

OVERVOLTAGE ARRESTER WITH AIR GAP

BACKGROUND OF THE INVENTION

The present invention relates to the field of electrical components and is to be applied in the structural realization of a gas discharge arrester provided with an air gap connected in parallel. This air gap is formed by a voltage-carrying electrode of the arrester, an auxiliary electrode at ground potential, and an insulating foil disposed between the electrode and auxiliary electrode and provided with openings.

In a known gas discharge overvoltage arrester with an air gap connected in parallel, the arrester consists of a tubular ceramic insulator and two electrodes disposed at the ends of the ceramic insulator. For the formation of a spark gap, the arrester is surrounded by a metal part in the form of a basket and in contact with the first electrode of the arrester and leads the potential of this electrode to the vicinity of the second electrode; placed on the second electrode is an insulating disk provided with openings, and on this insulating disk a metal disk is disposed in contact with the basket-like metal part and forms an auxiliary electrode. This auxiliary electrode has arches protruding into the openings of the insulating disk and is fixed in its position by means of an insulating fastening disk press-fitted on the contact cylinder of the second electrode. Centering of the arrester inside the basket-like metal part is done by means of the insulating disk, the outside diameter of which is greater than the outside diameter of the arrester and of the auxiliary electrode (DE-OS-A1-29 51 467).

In another known gas discharge overvoltage arrester with an air gap connected in parallel, the auxiliary electrode is formed by a metal ring which applies, with interposition of an insulating ring, against the flange-like bottom of a contact part connected to one electrode. The auxiliary electrode is electrically connected with the other electrode of the arrester via a basket-like metal part. Between the auxiliary electrode and the counter-electrode of the arrester is an insulating disk which centers the arrester inside the metal sleeve and at the same time insulates the counter-electrode from this basket-like metal part. In this arrester the ceramic insulator of the arrester is formed as a cylindrical tube of constant wall thickness, the outside diameter of the electrode and the outside diameter of the ceramic insulator being the same.

In a further known overvoltage arrester with an air gap connected in parallel, the auxiliary electrode is formed by a metal cap press-fitted on the ceramic insulator. To this end the diameter of the ceramic insulator is chosen greater than the outside diameter of the two electrodes of the arrester and the ceramic insulator is chamfered at its ends to achieve a flush transition to the electrodes (DE-A1-31 18 137).

SUMMARY OF THE INVENTION

It is an object of the present invention to simplify the structural design of the air gap and at the same time to reduce the cost of the manufacturing technology for the production of the arrester.

The above and other objects of the present invention are achieved by a gas discharge overvoltage arrester with an air gap connected in parallel, comprising of an arrester with a tubular ceramic insulator and two electrodes disposed at the ends of the ceramic insulator, further comprising of an insulating disk placed on the second electrode and provided with openings, an auxiliary electrode placed on the insulating disk and having the form of a metal disk in electrical contact with the first electrode, and an arrangement for fixing the auxiliary electrode on the arrester, wherein the ceramic insulator forms a cylindrical tube of constant wall thickness, the outside diameter of the auxiliary electrode being greater than the outside diameter of the second electrode and greater than the outside diameter of the ceramic insulator, the arrester, the insulating disk and the auxiliary electrode being enclosed by a cylindrical metal sleeve, one edge of which contacts the first electrode while its other edge gripping the auxiliary electrode is laid over inwardly, and the distance between the arrester and the metal sleeve in the region between the lower edge of the metal sleeve and the section of the ceramic insulator adjacent to the first electrode is, at least at three points uniformly distributed over the circumference, smaller than a required radial safety distance between the metal sleeve and the second electrode.

With such an organization of the arrester, the fixing of the auxiliary electrode occurs by means of a metal sleeve surrounding the arrester which at the same time establishes the contact between the first electrode and the auxiliary electrode. By giving appropriate dimensions to the auxiliary electrode and the actual arrester and by a specific correlation between arrester and metal sleeve furthermore the centering of the arrester in the metal sleeve is ensured without additional structural elements. In terms of manufacturing technology, it is of special importance that the insulator of the arrester is designed as a cylindrical tube of constant wall thickness, so that no production engineering measures are needed for chamfering a thick-walled insulator or for polishing the surface of the arrester to bring the latter to a very narrow diameter tolerance.

In a further development of the present invention, the centering of the arrester in the metal sleeve by maintaining a certain spacing can be realized by choosing the outside diameter of the first electrode to be greater than the outside diameter of the second electrode. In this case the centering of the arrester in the metal sleeve is done by a structural measure at the first electrode. In a further development of the invention, as an alternative, it may be provided that both electrodes of the arrester have the same outside diameter as the insulator and that the required minimum spacing between the arrester and the metal sleeve is achieved by reducing the diameter of the metal sleeve at appropriate points. For this purpose the metal sleeve may have a smaller diameter in the region of the first electrode than elsewhere. Alternatively, the metal sleeve may be provided, in particular in the region between the two electrodes, with at least three regional contractions uniformly distributed over the circumference or with a peripheral annular constriction, so that in the area of said contractions or constriction the arrester almost abuts on the cylindrical metal sleeve by its insulator and/or its first electrode. In any case it is ensured that between the second electrode and the cylindrical metal sleeve a spacing is maintained which is substantially greater than the electrode spacing of the air gap. If the air gap has, for example, an electrode spacing of 0.07 mm, the minimum distance between the second electrode and the metal sleeve should be approximately 0.2 mm.

BRIEF DESCRIPTION OF THE DRAWINGS

The invention will be described in greater detail in the following detailed description with reference to the drawings, in which.

DETAILED DESCRIPTION

Figure 1:
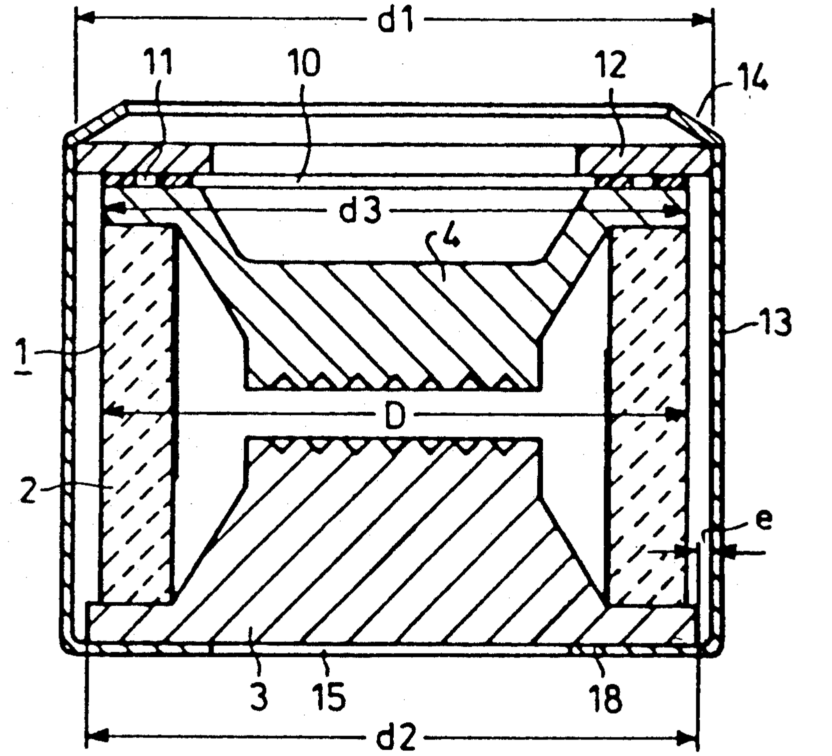
FIG. 1 shows a first embodiment of an overvoltage arrester where the outside diameter of the first electrode is greater than the outside diameter of the second electrode.

The overvoltage arrester with air gap connected in parallel according to FIG. 1 contains as the actual arrester a gas discharge overvoltage arrester 1 with a ceramic insulator 2, a first electrode 3, and a second electrode 4. The ceramic insulator 2 has the form of a cylindrical tube of constant wall thickness. Placed on the second electrode 4 is an insulating foil 10, for example a mica foil, provided with openings 11. Thereabove is the metal disk 12, which forms an auxiliary electrode with respect to the first electrode 3 and hence a counter-electrode to the second electrode 4. The arrester 1, insulating foil 10 and auxiliary electrode 12 are enclosed by a cylindrical metal sleeve 13, the lower edge 18 of which contacts the first electrode 3 while its upper edge 14 is laid over inwardly. By means of the edge 14 the auxiliary electrode 12 is fixed on the arrester 1. The metal sleeve may be made of a tube section or deep-drawn from a piece of sheetmetal.

The outside diameter d1 of the auxiliary electrode 12 corresponds to the inside diameter of the cylindrical metal sleeve 13 and is greater than the outside diameter d3 of the second electrode 4, i.e. greater than the outside diameter of the connecting flange of the second electrode 4, and hence also greater than the outside diameter D of the ceramic insulator 2. This results in a certain spacing between the second electrode 4 and the cylindrical metal sleeve 13 if the arrester and metal sleeve are centered relative to each other. For centering the arrester 1 in the metal sleeve 13, the outside diameter d2 of the first electrode 3 is chosen greater than the outside diameter D of the ceramic insulator 2 and greater than the outside diameter of the second electrode 4, i.e. greater than the outside diameter of the second electrode 4, i.e. greater than the outside diameter of the connecting flange of the second electrode 4. In this manner the centering of the arrester 1 in the bottom region of the metal sleeve 13 occurs so that the remaining distance e between the first electrode 3 and metal sleeve 13 is smaller than the required minimum distance between second electrode 4 and metal sleeve 13. The bottom of the metal sleeve 13, which forms at the same time the lower edge 18, is furthermore provided with an opening 15, to be able to contact the first electrode directly if desired.

Figure 2:
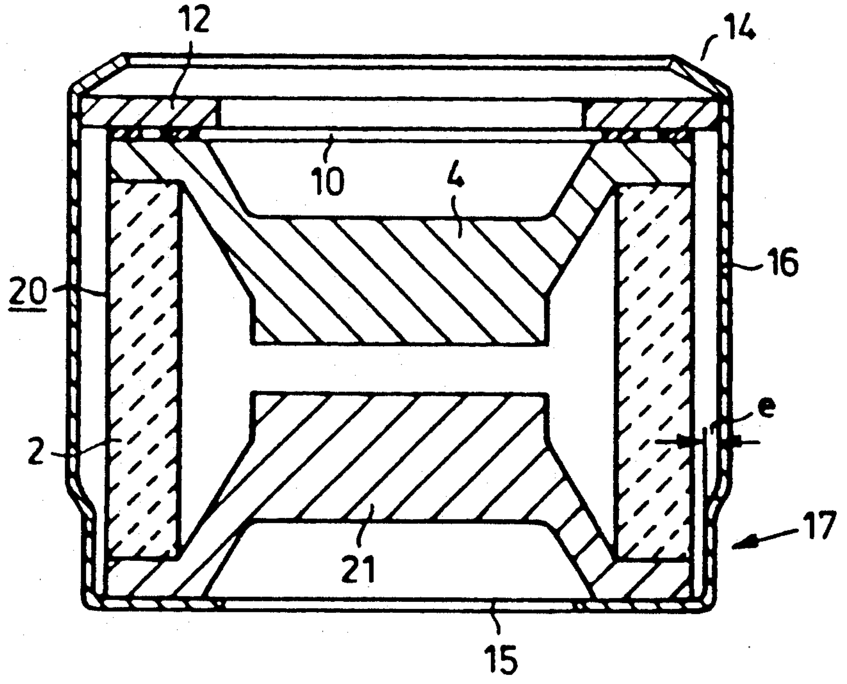
FIG. 2 shows a second embodiment of an overvoltage arrester where the first and the second electrodes are of similar design and the metal sleeve has in the region of the first electrode a smaller diameter that elsewhere.

In its basic design the overvoltage arrester according to FIG. 2 corresponds to the arrester of FIG. 1. Differing therefrom, the two electrodes 21 and 4 of the arrester 20 are a similar design and have the same outside diameter in the region of their attachment flange. This outside diameter is smaller than or equal to the outside diameter of the ceramic insulator 2, which forms a cylindrical tube of constant wall thickness.

For the centering of the arrester 20 in the metal sleeve 16, the metal sleeve in this embodiment has in the bottom region 17 a smaller diameter than elsewhere. This narrowing of the metal sleeve in the bottom region is chosen so that the spacing e remaining, when the arrester and metal sleeve are centered relative to each other, between the reduced diameter region of the metal sleeve and the arrester is smaller than the required safety distance between the attachment flange of the electrode 4 and the metal sleeve 16.

Figure 3:
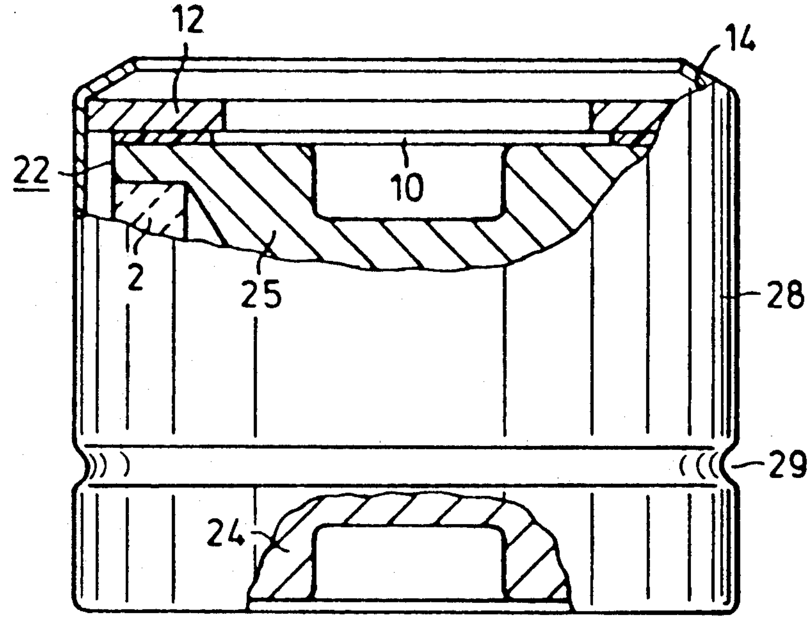
FIG. 3 shows a third embodiment of an overvoltage arrester where the metal sleeve is provided with an annular constriction.

The overvoltage arrester 22 of FIG. 3 corresponds in its basic design to the arrester of FIG. 2. As distinguished therefrom, for the centering of the arrester 22 equipped with the two electrodes 24 and 25 in the metal sleeve 28, the metal sleeve is provided with the annular constriction 29. There remains between the arrester 22 and the metal sleeve only enough clearance such that the arrester 22 can just be inserted into the metal sleeve.

Figure 4:
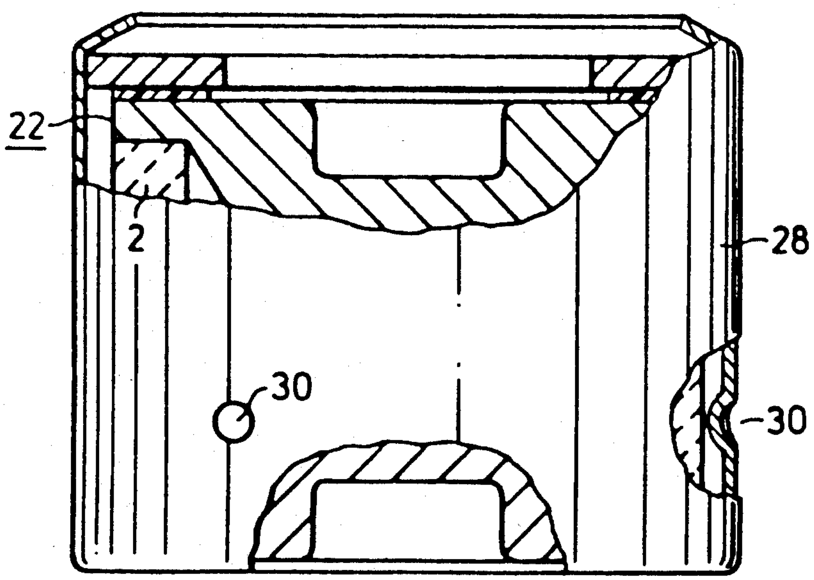
FIG. 4 shows a fourth embodiment of an overvoltage arrester where the metal sleeve is provided with three punctiform depressions.
Figure 1:
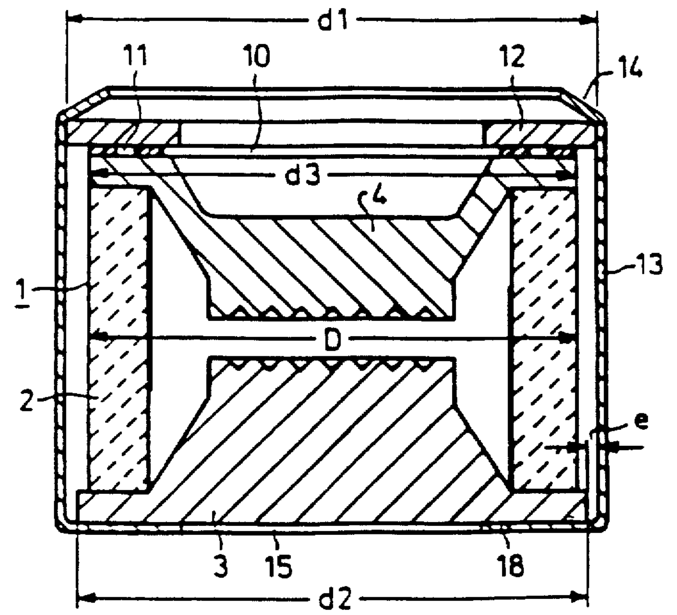
Figure 2:
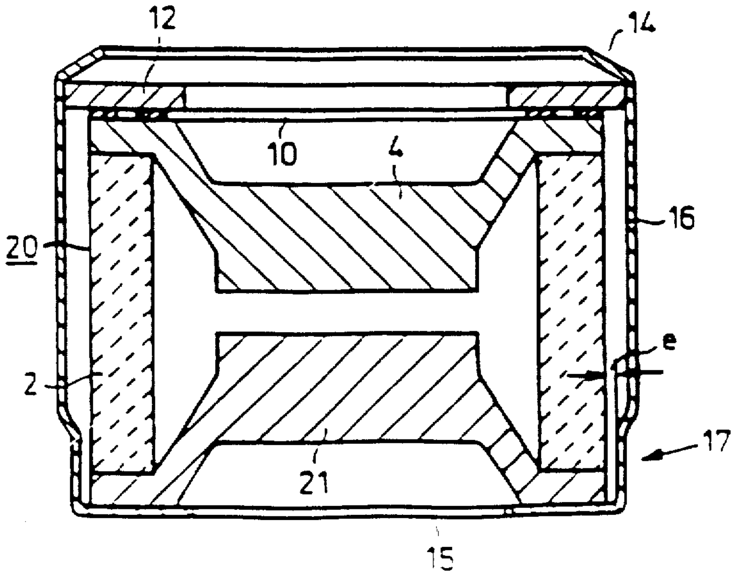

Of special advantage is a centering of the arrester in the metal sleeve according to FIG. 4. Here instead of the annular constrictions 29 of FIG. 3, regional, e.g. punctiform depressions 30, are provided at three points uniformly distributed over the circumference. Such depressions may alternatively have the form of a notch extending in the axial direction of the arrester.

In the foregoing specification, the present invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A gas discharge overvoltage arrester having an air gap connected in parallel comprising:

a) an arrester including:

(i) a tubular ceramic insulator having a first end, a second end, a constant wall thickness over an entire length of said tubular ceramic insulator inclusive of the first and second ends, and having an outside diameter;

(ii) a first electrode disposed at the first end of the tubular ceramic insulator adjacent to a section of the tubular ceramic insulator and having an outer diameter;

(iii) a second electrode being disposed at the second end of the tubular ceramic insulator and having an outside diameter approximately equal to the outside diameter of the tubular ceramic insulator;

b) an insulating disk having a plurality of openings and being disposed on the second electrode;

c) an auxiliary electrode being disposed on the insulating disk, having a form of a disk, being composed of a metal, being electrically coupled to the first electrode, and having an outside diameter greater than the outside diameter of the second electrode; and d) a cylindrical metal sleeve enclosing the arrester, the insulating disk and the auxiliary electrode, and fixing the auxiliary electrode on the arrester, including:

(i) a first edge directly contacting the first electrode;

(ii) a sidewall having a first inside diameter greater than the outside diameter of the first electrode and greater than the outside diameter of the second electrode, the side wall having a lower sidewall portion adjacent said first edge;

(iii) a beveled edge gripping the auxiliary electrode: and (iv) a circumference, wherein the first inside diameter of the cylindrical metal sleeve is reduced in a region near the first electrode in such a manner that the radial distance between the cylindrical metal sleeve and the first electrode or the tubular ceramic insulator in a region between the lower portion and the section of the tubular ceramic insulator adjacent to the first electrode is smaller than a required radial safety distance between the cylindrical metal sleeve and the second electrode at at least three points uniformly distributed over the circumference of the cylindrical metal sleeve thereby centering the arrester in the cylindrical metal sleeve.

2. The gas discharge arrester according to claim 1, wherein the cylindrical metal sleeve comprises a second diameter being a diameter of the cylindrical metal sleeve in a region near the first electrode, the second diameter being smaller than said first diameter.

3. The gas discharge arrester according to claim 1, wherein said first inside diameter of the cylindrical metal sleeve is reduced by an annular constriction being located in a region between said first and second electrodes.

4. A gas discharge overvoltage arrester having an air gap connected in parallel comprising:

a) an arrester including:

(i) a tubular ceramic insulator having a first end, a second end, a constant wall thickness over an entire length of said tubular ceramic insulator inclusive of the first and second ends, and having an outside diameter;

(ii) a first electrode disposed at the first end of the tubular ceramic insulator adjacent to a section of the tubular ceramic insulator and having an outer diameter;

(iii) a second electrode being disposed at the second end of the tubular ceramic insulator and having an outside diameter approximately equal to the outside diameter of the tubular ceramic insulator;

b) an insulating disk having a plurality of openings and being disposed on the second electrode;

c) an auxiliary electrode being disposed on the insulating disk, having a form of a disk, being composed of a metal, being electrically coupled to the first electrode, and having an outside diameter greater than the outside diameter of the second electrode; and d) a cylindrical metal sleeve enclosing the arrester, the insulating disk and the auxiliary electrode, and fixing the auxiliary electrode on the arrester, including:

(i) a first edge directly contacting the first electrode;

(ii) a sidewall having a first inside diameter greater than the outside diameter of the first electrode and greater than the outside diameter of the second electrode, the side wall having a lower sidewall portion adjacent said first edge;

(iii) a beveled edge gripping the auxiliary electrode; and (iv) a circumference, wherein the outside diameter of the first electrode is greater than the outside diameter of the second electrode in such a manner that the radial distance between the cylindrical metal sleeve and the first electrode or the tubular ceramic insulator in a region between the lower portion and the section of the tubular ceramic insulator adjacent to the first electrode is smaller than a required radial safety distance between the cylindrical metal sleeve and the second electrode at at least three points uniformly distributed over the circumference of the cylindrical metal sleeve thereby centering the arrester in the cylindrical metal sleeve.

* * * * *

UNITED STATES PATENT AND TRADEMARK OFFICE

CERTIFICATE OF CORRECTION

PATENT NO. : 5,142,434

DATED : August 25, 1992

INVENTOR(S) : Jurgen Boy, et al

It is certified that error appears in the above-indentified patent and that said Letters Patent is hereby corrected as shown below:

The title page, should be deleted to be replaced with the attached title page.

The drawing sheet consisting of Figs. 1 and 2, should be deleted to be replaced with the drawing sheet, consisting of Figs. 1 and 2, as shown on the attached page.

Signed and Sealed this

Eighth Day of February, 1994

Attest:

Bruce Lehman

BRUCE LEHMAN

Attesting Officer

Commissioner of Patents and Trademarks

US005142434A

United States Patent [19]

Boy et al.

[11] Patent Number: 5,142,434

[45] Date of Patent: Aug. 25, 1992

[54] OVERVOLTAGE ARRESTER WITH AIR GAP

[75] Inventors: Juergen Boy; Oskar Sippekamp, both of Berlin; Gerhard Schwenda, Grosshabersdorf, all of Fed. Rep. of Germany

[73] Assignee: Siemens Aktiengesellschaft, Munich, Fed. Rep. of Germany

[21] Appl. No.: 422,675

[22] Filed: Oct. 17, 1989

[30] Foreign Application Priority Data

Oct. 18, 1988 [DE] Fed. Rep. of Germany ....... 3835921

[51] Int. Cl.[5] ............ H02H 3/22

[52] U.S. Cl. ............ 361/120; 361/119; 361/117

[58] Field of Search ............ 361/111, 117, 119, 247, 361/124

[56] References Cited

U.S. PATENT DOCUMENTS 3,886,411 5/1975 Klayum ............ 361/119
4,128,855 12/1978 Gilberts ............ 361/119
4,320,435 3/1982 Jones
4,366,412 12/1982 Lange et al. ............ 313/325
4,455,258 7/1984 Chapman, Jr. et al.
4,502,087 12/1985 Huvet ............ 361/119
4,736,269 4/1988 Amein et al. ............ 361/128

FOREIGN PATENT DOCUMENTS 2740695 11/1978 Fed. Rep. of Germany
2951467 6/1982 Fed. Rep. of Germany
3118137 4/1986 Fed. Rep. of Germany

*Primary Examiner*—Steven L. Stephan
*Assistant Examiner*—Ben Davidson

[57] ABSTRACT

For reducing the engineering cost of construction and manufacture for the air gap associated with the second electrode in an overvoltage arrester with air gap connected in parallel, the arrester (22) is enclosed by a cylindrical metal sleeve (28). One edge (19) of this metal sleeve contacts the first electrode (3) of the arrester, while the other edge (14) is laid over inwardly and grips the auxiliary electrode (27) placed on the second electrode (25) with interposition of an insulating disk (26). The outside diameter of this auxiliary electrode (27) is greater than the outside diameter of the second electrode (25). For the centering of the arrester (22) in the metal sleeve (28) the distance between the arrester and the metal sleeve is smaller, at least at three points over the circumference, than the required radial safety distance between the metal sleeve and the second electrode. This can be achieved, for example, by several punctiform depressions (30) of the metal sleeve arranged uniformly distributed over the circumference or also by an annular construction (29).

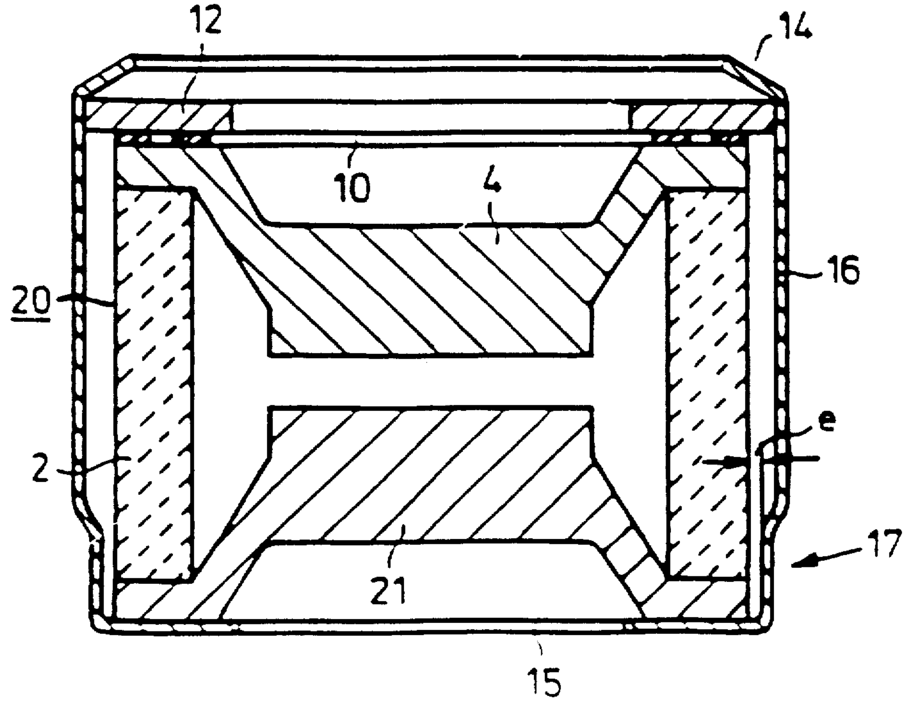

4 Claims, 2 Drawing Sheets